C. H. KAUFMANN.
SPOT LIGHT.
APPLICATION FILED MAY 19, 1917.
1,237,524. Patented Aug. 21, 1917.
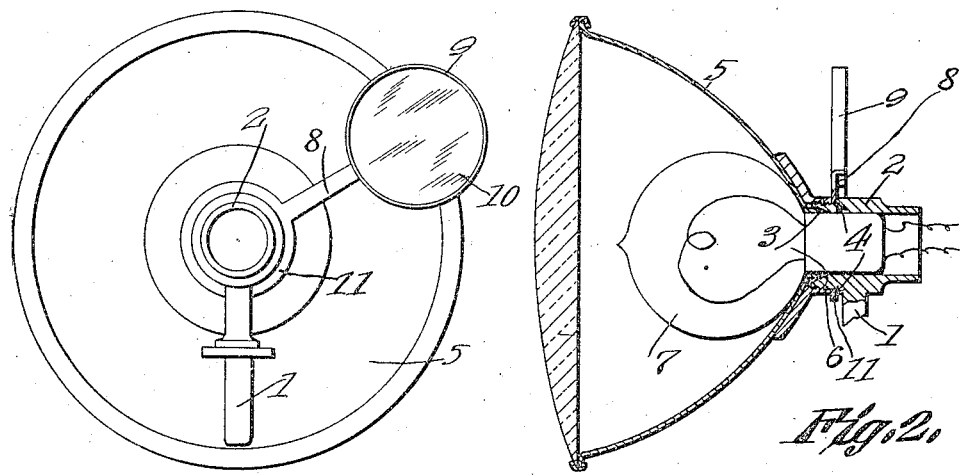
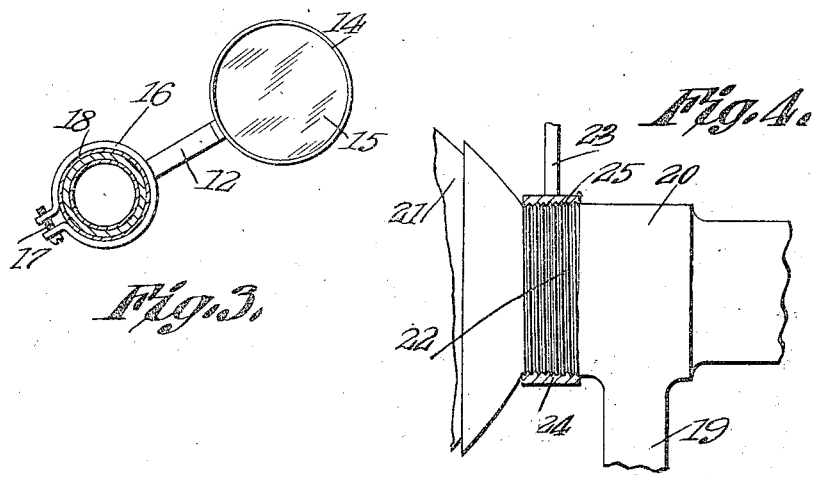

UNITED STATES PATENT OFFICE.

CARL H. KAUFMANN, OF SANTA ANA, CALIFORNIA.

SPOTLIGHT.

1,237,524.

Specification of Letters Patent. Patented Aug. 21, 1917.

Application filed May 19, 1917. Serial No. 169,684.

*To all whom it may concern:*

Be it known that I, CARL H. KAUFMANN, a citizen of the United States, residing at Santa Ana, in the county of Orange and State of California, have invented a new and useful Spotlight, of which the following is a specification.

It is the object of this invention to provide novel means for assembling a rearwardly facing mirror with the side light of a motor propelled vehicle.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in rear elevation, an automobile side light equipped with a mirror embodying one form of the present invention;

Fig. 2 is a transverse section taken through the structure shown in Fig. 1;

Fig. 3 is a fragmental vertical section showing a modified form of the invention;

Fig. 4 is a sectional detail showing a further modification.

In Figs. 1 and 2, the numeral 1 denotes a lamp standard provided at its upper end with a socket 2 having a reduced threaded end 3 defining a shoulder 4. A reflector is shown at 5 and is provided with a neck 6 into which the end 3 of the socket 2 is threaded. A lamp 7 of any desired kind is located within the reflector 5 and is carried by the socket 2.

The numeral 8 denotes a laterally extended arm provided at its outer end with a casing 9 carrying a mirror 10 which faces rearwardly with respect to the reflector 5. At its inner end, the arm 8 is provided with an eye 11 through which the threaded end 3 of the socket 2 passes, the eye 11 being bound between the shoulder 4 and the rear end of the neck 6 when the neck 6 is threaded onto the end 3 of the socket 2. Owing to the construction above described, the arm 8 and consequently the mirror 10 is held against vertical movement, but it is possible to adjust the vertical position of the mirror 10 by unscrewing the neck 6 of the reflector 5 from the end 3, so that the eye 11 no longer is bound and clamped between the rear end of the neck 6 and the shoulder 4.

In Fig. 3 of the drawings, wherein a modification of the invention is shown, the arm appears at 12 and carries a casing 14 inclosing a rearwardly facing mirror 15. The inner end of the arm 12 is provided with a clamp 16, the ends of which are united by a screw 17 or in any other suitable manner, the clamp 16 being held upon the neck 18 of the reflector.

As delineated in Fig. 4, the standard appears at 19 and the lamp socket is shown at 20. The numeral 21 marks a portion of the reflector, and the neck of the reflector is shown at 22. At 23 there is depicted an arm adapted to carry a mirror as above described, the inner end of the arm being provided with a circular head 24 threaded at 25 onto the neck 22 of the reflector.

From the foregoing it will be seen that a simple but efficient means is provided whereby a mirror may be assembled with an automobile lamp. There is a legitimate and novel combination between a rearwardly facing mirror and a forwardly illuminating lamp, notably if the lamp is mounted for rotation to follow the direction in which the vehicle turns.

Having thus described the invention, what is claimed is:—

In a device of the class described, an automobile lamp comprising a reflector; a rearwardly projecting lamp socket assembled with the reflector; an arm mounted at its inner end on the socket to swing for adjustment transversely of the axis of the socket; and a rearwardly facing reflector carried by the outer end of the arm.

In testimony that I claim the foregoing as my own, I have hereto affixed my signature in the presence of two witnesses.

CARL H. KAUFMANN.

Witnesses:
D. N. KELLY,
J. R. MAYER, Jr.